(12) United States Patent
Ogawa et al.

(10) Patent No.: US 8,706,266 B2
(45) Date of Patent: Apr. 22, 2014

(54) POWER CONTROL SYSTEM

(75) Inventors: Takeshi Ogawa, Osaka (JP); Yosihiko Tokunaga, Hyogo (JP); Yasuhiro Yanagi, Osaka (JP); Masaru Hashimoto, Osaka (JP); Izumi Usuki, Osaka (JP); Hisashi Takayama, Osaka (JP); Nobuo Matsuo, Hyogo (JP)

(73) Assignee: Panasonic Corporation, Osaka (JP)

( * ) Notice: Subject to any disclaimer, the term of this patent is extended or adjusted under 35 U.S.C. 154(b) by 103 days.

(21) Appl. No.: 13/395,215

(22) PCT Filed: Sep. 6, 2010

(86) PCT No.: PCT/IB2010/002202
§ 371 (c)(1),
(2), (4) Date: Apr. 19, 2012

(87) PCT Pub. No.: WO2011/030200
PCT Pub. Date: Mar. 17, 2011

(65) Prior Publication Data
US 2012/0316693 A1 Dec. 13, 2012

(30) Foreign Application Priority Data
Sep. 9, 2009 (JP) ................................. 2009-208432

(51) Int. Cl.
*G05B 11/01* (2006.01)
*G01R 21/06* (2006.01)

(52) U.S. Cl.
USPC ............................. 700/22; 700/295; 702/62

(58) Field of Classification Search
None
See application file for complete search history.

(56) References Cited

U.S. PATENT DOCUMENTS

| | | | |
|---|---|---|---|
| 3,400,374 A * | 9/1968 | Schumann | 700/278 |
| 4,477,733 A | 10/1984 | Herdeman | |
| 4,611,289 A * | 9/1986 | Coppola | 713/300 |
| 6,587,739 B1 * | 7/2003 | Abrams et al. | 700/83 |
| 6,915,185 B2 | 7/2005 | Yamamoto et al. | |
| 2002/0000092 A1 | 1/2002 | Sharood et al. | |
| 2005/0065742 A1 * | 3/2005 | Rodgers | 702/62 |
| 2005/0116836 A1 * | 6/2005 | Perry et al. | 340/870.02 |
| 2008/0088180 A1 | 4/2008 | Cash et al. | |
| 2009/0243517 A1 * | 10/2009 | Verfuerth et al. | 315/315 |
| 2010/0088261 A1 * | 4/2010 | Montalvo | 706/15 |

FOREIGN PATENT DOCUMENTS

| | | |
|---|---|---|
| EP | 0209421 A | 1/1987 |
| JP | H638369 | 2/1994 |
| JP | 200078748 | 3/2000 |
| JP | 2001331572 | 11/2001 |
| JP | 3628270 | 3/2005 |
| JP | 2009165254 | 7/2009 |

OTHER PUBLICATIONS

The International Search Report for PCT/IB2010/02202.
European Search Report dated Nov. 6, 2013 issued in the corresponding European application No. 10815052.5.

* cited by examiner

*Primary Examiner* — Sean Shechtman
(74) *Attorney, Agent, or Firm* — Bacon & Thomas, PLLC

(57) ABSTRACT

A power control system is provided with a plurality of electric appliances and a power control apparatus that controls the operation of the plurality of electric devices. The plurality of electric devices are grouped into one or a plurality of groups, each group containing a plurality of electric devices, and on the basis of state information of the electric devices, the power control apparatus controls the operation of each electric device by group according to a plurality of sets of control contents prepared ahead of time.

10 Claims, 6 Drawing Sheets

FIG.3A

| ROOM NO | ROOM NAME | AREA | ROOM TYPE | ROOM POSITION |
|---|---|---|---|---|
| 1 | LIVING ROOM | 6 MATS | FLOORING | SOUTH |
| 2 | KITCHEN | 6 MATS | FLOORING | SOUTH EAST |
| 3 | GUEST ROOM | 6 MATS | JAPAN-STYLE | NORTH |

FIG.3B

| APPLIANCE NO | APPLIANCE NAME | TYPE NO | CURRENT STATE |
|---|---|---|---|
| 1 | AIR CONDITIONER 1 | x x x - x x x | OPERATING |
| 2 | AIR CONDITIONER 2 | x x x - x x x | OPERATING |
| 3 | TV SET | x x x - x x x | OPERATING |
| 4 | FLOOR HEATER | x x x - x x x | OPERATING |
| 5 | REFRIGERATOR | x x x - x x x | OPERATING |

FIG.3C

| ROOM NO | ROOM NAME | APPLIANCE | PEAK CUT ACTUAL MANAGEMENT OPERATION |
|---|---|---|---|
| 1 | LIVING ROOM | AIR CONDITIONER 1 | SET TEMPERATURE ADJUSTED |
| | | TV SET | LEAVE AS IT IS |
| | | FLOOR HEATER | SET TEMPERATURE ADJUSTED |
| 2 | KITCHEN | REFRIGERATOR | LEAVE AS IT IS (ALWAYS ON) |
| 3 | GUEST ROOM | AIR CONDITIONER 2 | OFF |

FIG.3D

| APPLIANCE TYPE | TYPE NO | RATED POWER | PEAK CUT BASIC OPERATION |
|---|---|---|---|
| REFRIGERATOR | xxx-xxx | x xW | LEAVE AS IT IS (ALWAYS ON) |
| REFRIGERATOR | xxx-xxx | x xW | LEAVE AS IT IS (ALWAYS ON) |
| REFRIGERATOR | xxx-xxx | x xW | LEAVE AS IT IS (ALWAYS ON) |
| REFRIGERATOR | xxx-xxx | x xW | LEAVE AS IT IS (ALWAYS ON) |
| AIR CONDITIONER | xxx-xxx | x xW | OFF |
| AIR CONDITIONER | xxx-xxx | x xW | OFF |
| AIR CONDITIONER | xxx-xxx | x xW | OFF |
| AIR CONDITIONER | xxx-xxx | x xW | OFF |
| AIR CONDITIONER | xxx-xxx | x xW | OFF |

FIG. 4

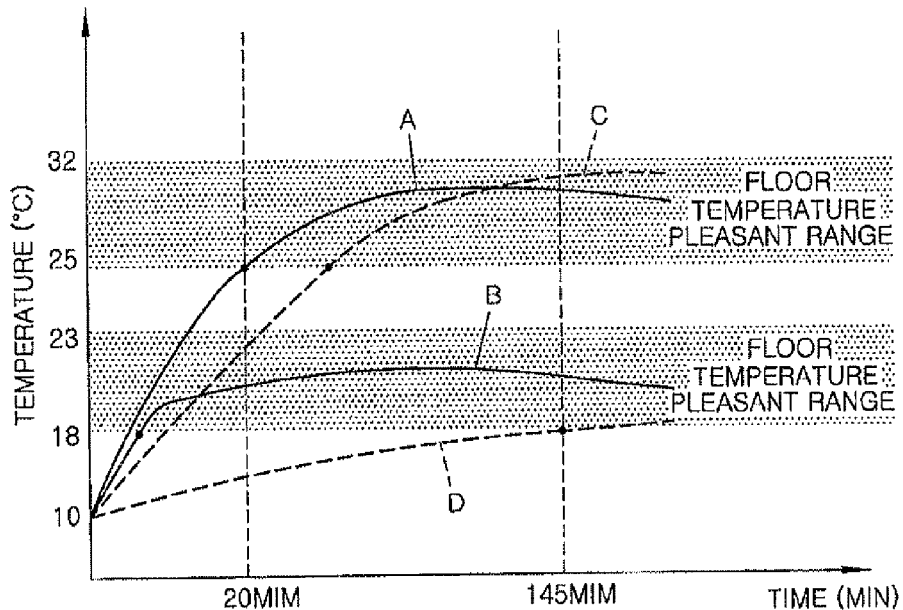

FIG. 5

| TIME | ROOM NAME | APPLIANCE | STATE | SET TEMPERATURE |
|---|---|---|---|---|
| 2009/8/6 6:03 | LIVING ROOM | AIR CONDITIONER 1 | ON | 24°C |
| 2009/8/6 6:03 | LIVING ROOM | TV SET | ON | |
| 2009/8/6 7:37 | LIVING ROOM | AIR CONDITIONER 1 | OFF | |
| 2009/8/6 7:37 | LIVING ROOM | TV SET | OFF | |
| 2009/8/6 19:54 | LIVING ROOM | AIR CONDITIONER 1 | ON | 24°C |
| 2009/8/6 19:55 | LIVING ROOM | TV SET | ON | |
| 2009/8/6 23:37 | LIVING ROOM | AIR CONDITIONER 1 | OFF | |
| 2009/8/6 23:37 | LIVING ROOM | TV SET | OFF | |
| 2009/8/7 6:02 | LIVING ROOM | AIR CONDITIONER 1 | ON | 24°C |
| 2009/8/7 6:02 | LIVING ROOM | TV SET | ON | |
| 2009/8/7 7:37 | LIVING ROOM | AIR CONDITIONER 1 | OFF | |
| 2009/8/7 7:37 | LIVING ROOM | TV SET | OFF | |
| 2009/8/7 22:32 | LIVING ROOM | AIR CONDITIONER 1 | ON | 24°C |
| 2009/8/7 22:32 | LIVING ROOM | TV SET | ON | |
| 2009/8/7 23:37 | LIVING ROOM | AIR CONDITIONER 1 | OFF | |
| 2009/8/7 23:37 | LIVING ROOM | TV SET | OFF | |

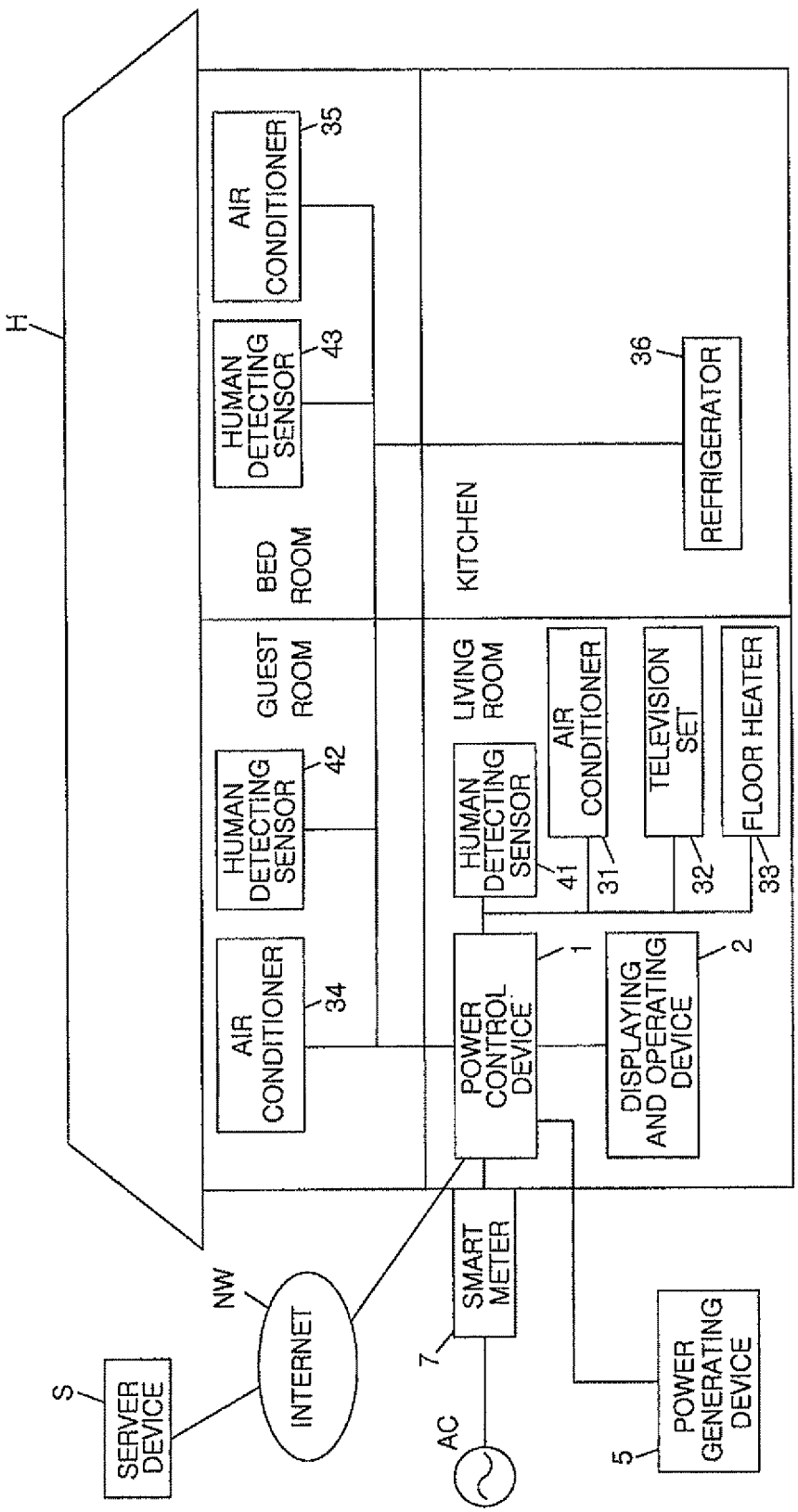

POWER CONTROL SYSTEM

FIELD OF THE INVENTION

The present invention relates to a power control system that can save electric power by controlling electric appliances used in a house.

BACKGROUND OF THE INVENTION

As one example of conventional power control systems, Japanese Patent No. 3628270 discloses a power control system in which, pursuant to the required electricity amount notified from a plurality of electric appliances, a power control device controls the power generation amount of a fuel cell or a solar cell to thereby supply a required amount of electric power to the electric appliances at a required time.

The conventional power control system disclosed in Japanese Patent No. 3628270 seeks to save electric power by causing a fuel cell to generate electric power in an efficient manner. The electric appliances consuming the electric power are not controlled by the power control system. Accordingly, there is a possibility that the electric power consumed in a house cannot be saved if the electric appliances unnecessarily consume the electric power.

If the power consumption is merely cut down, e.g., if the setting temperature of an air conditioner is merely increased (during a cooling operation) or decreased (during a heating operation), the amenity felt by a person dwelling in a house (a dweller) may be impaired. Thus, it may be sometimes rather inefficient to merely cut down the power consumption.

SUMMARY OF THE INVENTION

In view of the above, the present invention provides a power control system capable of saving electric power without impairing the amenity during the course of using electric appliances.

In accordance with an aspect of the present invention, there is provided a power control system including: a plurality of electric appliances; and a power control device for controlling operations of the electric appliances, wherein the electric appliances are assorted into one or more groups each including two or more electric appliances, and the power control device controls operations of the electric appliances on a group-by-group basis according to a plurality of control options prepared in advance based on state information of the electric appliances.

With this configuration, the power control device is configured to control operations of the electric appliances on a group-by-group basis according to a plurality of control options prepared in advance and pursuant to state information of the electric appliances. It is therefore possible to save electric power without impairing the amenity during the course of using the electric appliances.

The power control device may be configured to change the control options depending on the kind and number of the electric appliances belonging to the same group as the state information.

The groups preferably include a group including a plurality of cooling and heating electric appliances, and the power control device may be configured to control the cooling and heating electric appliances in association with each other.

With this configuration, an air conditioner and a floor heater are controlled in association with each other, e.g., when heating a room. This makes it possible to save electric power while rapidly and efficiently heating the room.

The groups may include a human detector for detecting a human existing in a monitoring region and notifying the power control device of presence or absence of the human, and the power control device may be configured to control the electric appliances by use of different control options when the human is detected by the human detector and when the human is not detected by the human detector.

With this configuration, it is possible to control the electric appliances with suitable control options depending on the existence or absence of a human.

The groups may include a group to which the electric appliances required to be operated at all times belong.

The power control device may be configured to receive a control command from a power company and to reduce power consumption by controlling the electric appliances other than the electric appliances required to be operated at all times, when the control command requests the power control device to reduce power consumption.

With this configuration, it is possible to avoid excessive use of electric power.

The power control device may be configured to receive an operation input setting an upper limit value of power consumption and to reduce power consumption by controlling the electric appliances other than the electric appliances required to be operated at all times, when it is determined that the power consumption is likely to exceed the upper limit value.

With this configuration, it is possible to avoid excessive use of electric power.

The power control device may be configured to detect failure of the electric appliances by confirming operation states of the electric appliances and releases the group to which the electric appliance under failure belongs upon detecting failure of one of the electric appliances.

The power control device preferably stores, as a threshold value, an average setting value acquired from use history information including use time, use frequency and setting content of the electric appliances and determines disposition of a dweller based on the threshold value to reflect the disposition of the dweller in selecting the control options With this configuration, it is possible to control the electric appliances with suitable control options depending on the dweller information such as the age and the sensitivity to heat and cold.

The power control system further includes: a server device for making data communications with the power control device. When one of the electric appliances is replaced and identification information thereof is renewed, the power control device transmits the renewed identification information to the server device and acquires performance information of the electric appliance corresponding to the renewed identification information from the server device to change the control options pursuant to the performance information.

With this configuration, it is possible to control the electric appliances with suitable control options depending on the addition or change of the electric appliances.

The power control system may further includes: a server device for making data communications with the power control device, wherein the power control device transmits identification information of the electric appliances and measured power consumption of the electric appliances to the server device, and wherein the server device finds a statistical value of power consumption on the electric appliance having the same identification information as the identification information received and transmits a warning notice to the power control device if the power consumption received is out of a normal range set pursuant to the statistical value.

With this configuration, it is possible to urge a dweller to correct the failure or the erroneous use of the electric appliances, thereby saving the electric power.

With the present invention, it is possible to save electric power without impairing the amenity during the course of using the electric appliances.

BRIEF DESCRIPTION OF THE DRAWINGS

The objects and features of the present invention will become apparent from the following description of preferred embodiments given in conjunction with the accompanying drawings.

FIG. 3A is a room information list, FIG. 3B is an appliance information list, FIG. 3C is a room-appliance correlation list, and FIG. 3D is an electric appliance specification table.

FIG. 4 is a view for explaining the operation of the power control device employed in the power control system.

FIG. 5 is a use history information list used in the power control system.

FIG. 6 is a diagram showing a configuration of a power control system in accordance with a second embodiment of the present invention.

DETAILED DESCRIPTION OF THE PREFERRED EMBODIMENTS

Embodiments of the present invention will now be described in detail with reference to the accompanying drawings which forms a part of the subject specification. Identical or similar parts throughout the drawings will be designated by like reference symbols and redundant description thereof will be omitted The following description is directed to an embodiment in which the technical concept of the present invention is applied to a power control system installed in a detached house. However, the present invention is not limited to a power control system for a detached house but may be applied to power control systems for an apartment house, such as a mansion or the like, and for an office building.

First Embodiment

Figure 1:
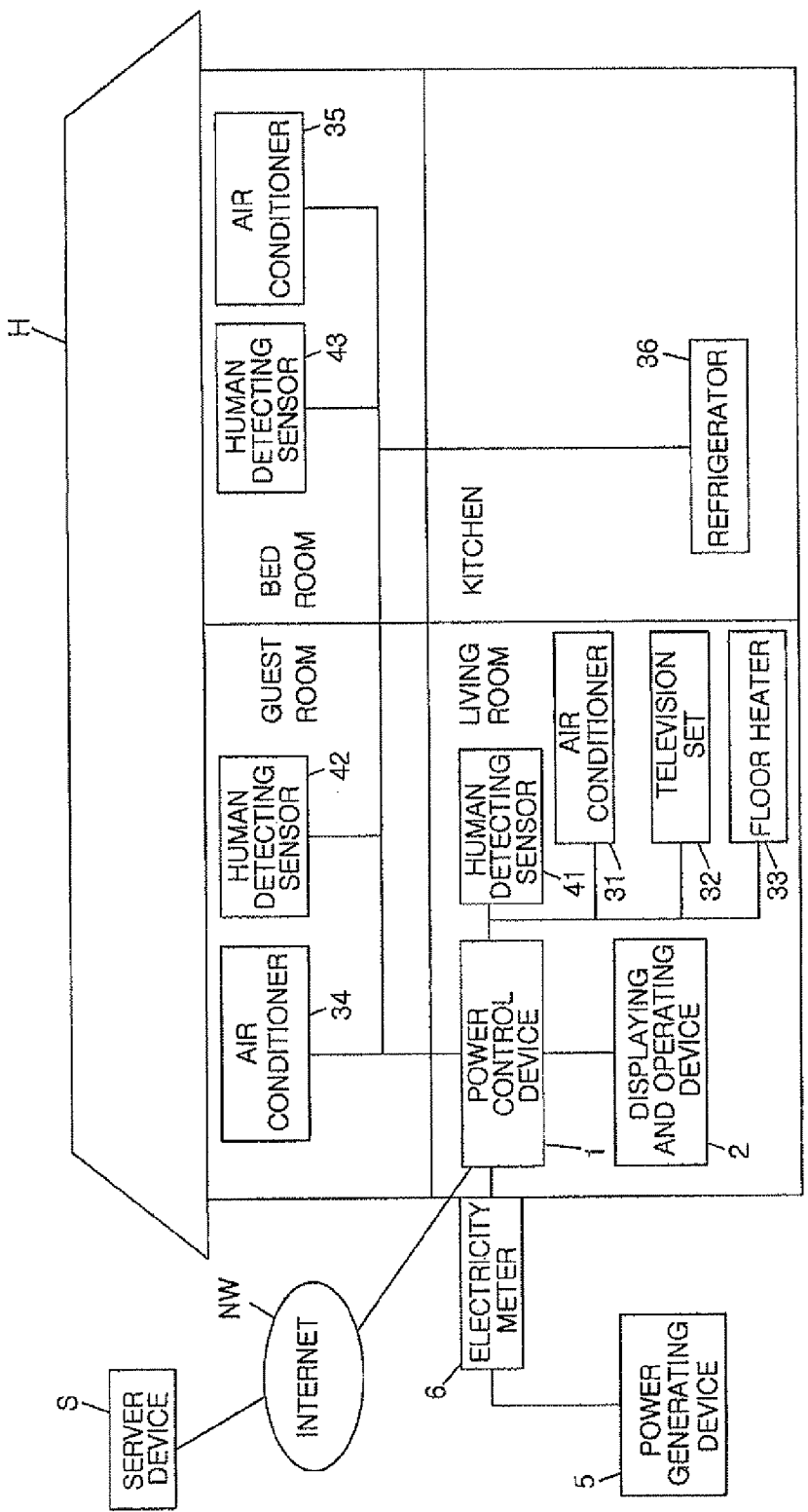
FIG. 1 is a diagram showing a configuration of a power control system in accordance with a first embodiment of the present invention.

As shown in FIG. 1, the power control system of the present embodiment includes a plurality of electric appliances 3 (31 through 36) used in a house H, a power control device 1 for controlling the operations of the electric appliances 3, a displaying and operating device 2, a plurality of human detecting sensors 4 (41 through 43), a power generating device 5 and a server device S installed in a place distant from the house H.

The power generating device 5 includes, e.g., a solar cell and a power conditioner for photovoltaic power generation, or a fuel cell and a power conditioner for the fuel cell. The power generating device 5 supplies electric energy (electric power) to the inside of a house H (hereinafter referred to as "home") through the power control device 1.

In the present embodiment, rooms such as a living room, a guest room, a bed room and a kitchen are provided in the house H. The electric appliances 3 are installed in the corresponding rooms. For example, an air conditioner 31, a television set 32 and a floor heater 33 are installed in the living room. Air conditioners 34 and 35 are installed in the guest room and the bed room, respectively. A refrigerator 36 is installed in the kitchen. The electric appliances 3 installed in the rooms are nothing more than examples. The kind and number of the electric appliances 3 are not limited thereto.

In the present embodiment, each of the electric appliances 3 is equipped with an information transmitting unit for transmitting different kinds of information (data) to the power control device 1. As the information transmitting unit, there is available a communications device (such as a LAN controller or a PLC modem) that uses, e.g., wired LAN (100BASE-TX or the like) employing a twisted pair cable (a LAN cable) as a communication medium, PLC (Power Line Communication) employing a power feeding line for the supply of electric power (a power cable) as a communication medium, wireless communications (wireless LAN or Bluetooth) employing electric waves as a communication medium, or optical communication employing infrared rays or visible rays as a communication medium. In the present embodiment, each of the electric appliances 3 is equipped with a LAN controller.

Each of the human detecting sensors 4 includes the aforementioned communications device (e.g., the LAN controller) and a pyroelectric human detecting sensor for detecting heat rays emitted from a human body through the use of a pyroelectric element, a human detecting sensor of a ultrasound Doppler type which receives ultrasonic waves reflected from a moving body (e.g., a human body) through the use of an ultrasonic microphone, or an human detecting sensor of an electric wave Doppler type which emits electric waves and receiving the electric waves reflected from a moving body (e.g., a human body). Each of the human detecting sensors 4 transmits human detection results to the power control device 1 through the communications device.

Figure 2A:
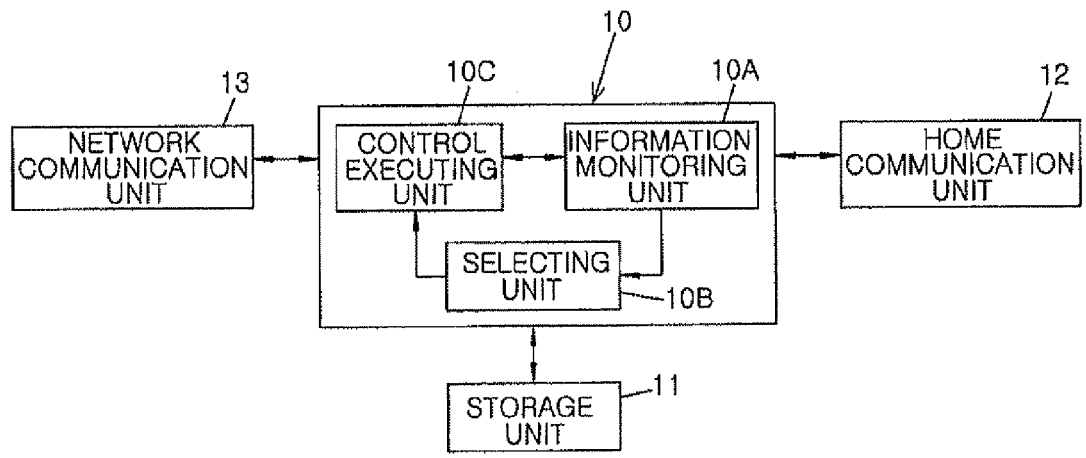
FIG. 2A is a block diagram showing a power control device employed in the power control system.
Figure 2B:
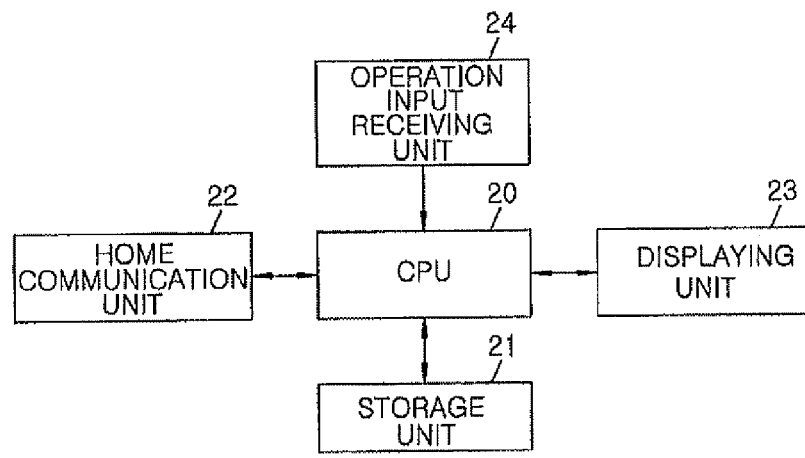
FIG. 2B is a block diagram showing a displaying and operating device employed in the power control system.

As shown in FIG. 2A, the power control device 1 includes a control block 10, a storage unit 11 for storing data in a storage medium such as a semiconductor memory or a magnetic disk, a home communication unit 12 for performing data communications with the communications devices of the electric appliances 3 and the human detecting sensors 4, and a network communication unit 13 connected to the Internet NW through a telephone cable, an optical fiber cable or a CATV cable and designed to perform data communication with the server device S via the Internet NW.

The control block 10 includes an information monitoring unit 10A for normally monitoring the states (operation, stop, temperature setting and power consumption) of the respective electric appliances 3 and the presence situations of humans in the respective rooms by making communications with the electric appliances 3 and the human detecting sensors 4 through the home communication unit 12. The control block 10 further includes a selecting unit 10B for selecting a suitable one of control options stored in the storage unit 11 pursuant to the information (the states of the electric appliances 3 and the presence situations of humans in the respective rooms) monitored by the information monitoring unit 10A, and a control executing unit 10C for executing the control option selected by the selecting unit 10B.

The information monitoring unit 10A, the selecting unit 10B and the control executing unit 100 are realized when a CPU making up the control unit 22 executes programs stored in the storage unit 11. While not described in detail, the control block 10 of the power control device 1 can transmit a control command to the power generating device 5 through the data communications performed by the home communication unit 12, thereby controlling the electricity amount generated in the power generating device 5.

As shown in FIG. 25, the displaying and operating device 2 includes a CPU 20, a storage unit 21 for storing data in a storage medium such as a semiconductor memory or a magnetic disk, a home communication unit 22 for making data communications with the home communication unit 12 of the power control device 1 and with the communications devices of the electric appliances 3 and the human detecting sensors 4 and a displaying unit 23 having a liquid crystal monitor (LCD) and an LCD driver. The displaying and operation device 2 further includes an operation input receiving unit 24 for receiving an operation input inputted by a user (or a dweller) and outputting an operation signal to the CPU 20, the operation input receiving unit 24 having mechanical push button switches or a touch panel. The programs stored in the storage unit 21 are executed by the CPU 20, thereby realizing different functions to be described later.

The server device S includes a general-purpose computer having a network communication function, and a server program (software). The server device S makes data communications with the power control device 1 through the Internet NW.

In this regard, unique addresses (e.g., individual IP addresses) for data communications are allotted to the electric appliances 3 and the human detecting sensors 4, each of which is equipped with a communication device, the power control device 1 provided with the home communication unit 12, and the displaying and operating device 2 provided with the home communication unit 22. In addition, addresses (global IP addresses) required for the network communication unit 13 to make communications through the Internet NW are allotted to the power control device 1 and the server device S. In other words, packets designating the individual IP addresses as a destination address and a source address are transmitted between the power control device 1 and the electric appliances 3 and the human detecting sensors 4 and between the power control device 1 and the displaying and operating device 2. Therefore, different kinds of information are sent and received through the use of the packets.

Similarly, packets designating the global IF addresses as a destination address and a source address are transmitted between the power control device 1 and the server device S. Accordingly, different kinds of information are sent and received through the use of the packets.

As shown in FIG. 3A, a list of information on the rooms (a room information list) is stored in the storage unit 11 of the power control device 1. In the house H of the present embodiment, the living room of room number 1 has an area equivalent to six Tatami mats (traditional mats used in Japan). The living room is of a flooring type (which means the material of floor) and is positioned on the south side of the home. The kitchen of room number 2 has an area equivalent to six Tatami mats. The kitchen is of a flooring type and is positioned on the south east side of the home. The guest room of room number 3 has an area equivalent to six Tatami mats. The guest room is a Japan-style room (Tatami room) and is positioned on the north side of the home. A contractor or a dweller inputs such information (data) by operating the touch panel of the operation input receiving unit 24 of the displaying and operating device 2 when initially setting the power control device 1. The information thus inputted is transmitted from the home communication unit 22 of the displaying and operating device 2 to the home communication unit 12 of the power control device 1.

Further, a list of information on the electric appliances 3 (an appliance information list) is stored in the storage unit 11 of the power control device 1. In the appliance information list shown in FIG. 3B, unique appliance numbers and appliance names are allotted to the respective electric appliances 3 to be controlled. The type numbers and the current states (operating or stopped) of the respective electric appliances 3 are correlated with the unique appliance numbers and the appliance names.

The control block 10 (the information monitoring unit 10A) of the power control device 1 renews the current states in the appliance information list by periodically confirming the operation states of all the electric appliances 3 through the home communication unit 12. A contractor or a dweller inputs the appliance numbers, the appliance names and the type numbers by operating the touch panel of the operation input receiving unit 24 of the displaying and operating device 2 when initially setting the power control device 1. The appliance numbers, the appliance names and the type numbers are transmitted from the home communication unit 22 of the displaying and operating device 2 to the home communication unit 12 of the power control device 1 and are written in the appliance information list of the storage unit 11 by the information monitoring unit 10A of the control block 10.

However, when the electric appliances 3 store and hold their own appliance numbers, appliance names and type numbers in their own memories, the information monitoring unit 10A of the control block 10 can read and acquire the appliance numbers, the appliance names and the type numbers stored in the memories through the home communication unit 12. The type numbers of the respective electric appliances in the appliance information list are transmitted to the server device S through the network communication unit 13. The information on the electric appliances corresponding to the type numbers, e.g., the information on the output power or the kinds of operation modes (such as the existence or absence of a power saving mode for restraining the maximum output power), is acquired through network communications and is reflected in the control options stored in the storage unit 11.

An information list (room-appliance correlation list) indicating the correlation between the rooms, the electric appliances 3 installed in the rooms and the operations (peak-cut actual management operations) to be performed by the electric appliances 3 when the power consumption exceeds an upper limit value (to be described later) is stored in the storage unit 11 of the power control device 1. In the room-appliance correlation list shown in FIG. 3C, an air conditioner 31, a television set 32 and a floor heater 33 are correlated with the living room of room number 1. A refrigerator 36 is correlated with the kitchen of room number 2. An air conditioner 34 is correlated with the guest room of room number 3. A contractor or a dweller makes such correlation by operating the touch panel of the operation input receiving unit 24 of the displaying and operating device 2.

With regard to the peak-cut actual management operations of the respective electric appliances 3, as shown in FIG. 3C, "Set temperature adjusted" is correlated with the air conditioner 31 and the floor heater 33. "OFF (stopped)" is correlated with the air conditioner 34. "Leave as it is" meaning that the operation state is not changed even if the power consumption exceeds an upper limit value is correlated with the television set 32 and the refrigerator 36. Referring to FIG. 3D, the information on the specifications of the electric appliances (e.g., the appliance kinds, the type numbers, the rated power and the peak-cut basic operations) is stored in the storage unit 11 in the form of a table (hereinafter referred to as "specification table"). The power control device 1 performs a peak-cut control by which the operations of the electric appliances 3 are controlled according to the information of the specification table so that the power consumption can be kept less than the upper limit value. As a rule, the peak-cut basic operations of the specification table are applied to the contents of the peak-cut actual management operations in the room-appliance correlation list. Alternatively, a contractor or a dweller may set the contents of the peak cut actual management operations by operating the touch panel of the operation input receiving unit 24 of the displaying and operating device 2.

Pursuant to the room-appliance correlation list shown in FIG. 3C, the control block 10 (the selecting unit 10B) of the power control device 1 assorts group by group the electric appliances 3 installed in the respective rooms and determines suitable power control options capable of saving electric power without impairing the amenity in the rooms. For example, the cooling and heating electric appliances (the air conditioner 31 and the floor heater 33) among the electric appliances 3 installed in the living room are assorted into the same group. This makes it possible to perform the power control in such a way as to save electric power while cooling or heating the rooms (i.e., the living room) more rapidly and efficiently than when the air conditioner 31 or the floor heater 33 is independently operated (driven).

For example, if heating is started when the room temperature and the floor temperature are kept at 10° C., the selecting unit 10B of the control block 10 selects the control option of operating (driving) the air conditioner 31 and the floor heater 33 belonging to the same group in association with each other. The control executing unit 10C executes the control option thus selected. In this case, as indicated by solid lines A and B in FIG. 4, the room temperature and the floor temperature can be increased to a pleasant room temperature range from 18 to 23° C. and a pleasant floor temperature range from 25 to 32° C. just within about 20 minutes.

On the other hand, if the floor heater 33 alone is operated (driven), as indicated by broken lines C and D in FIG. 4, it takes about 145 minutes nearly seven times greater than 20 minutes to reach both the pleasant room temperature range and the pleasant floor temperature range. Thus the time required in reaching the pleasant room temperature range and the pleasant floor temperature range can be sharply reduced by operating (driving) the air conditioner 31 and the floor heater 33 in association with each other rather than independently operating (driving) the floor heater 33.

After reaching the pleasant room temperature range, a control is performed to intermittently stop the air conditioner 31 or the floor heater 33 or to reduce the set temperature of the air conditioner 31 or the floor heater 33. This makes it possible to save the electric power while rapidly and efficiently heating the rooms (the living room).

When assorting the electric appliances group by group, the electric appliances required to be operated (driven) at all times, such as the refrigerator 36 and the like, may be assorted into the same group. Not only the electric appliances 3 installed in the same room but also the electric appliances 3 installed in different rooms, e.g., two air conditioners 31 and 34 installed in the living room and the guest room may be assorted into the same group. By operating (driving) the two air conditioners 31 and 34 in association with each other, it is possible to save the electric power while keeping the home pleasant as a whole.

Certain electric appliances such as illumination devices are usually stopped (turned off) in the daytime. In view of this, the electric appliances 3 to be always stopped in the daytime may be assorted into the same group. The various kinds of grouping set forth above can be automatically performed by the control block 10 of the power control device 1 according to a program or can be manually performed by a user (dweller) through the use of the displaying and operating device 2.

In this regard, the selecting unit 10B of the control block 10 selects the control options depending on the assortment states (the kind and number of the electric appliances 3 belonging to the same group, which shall apply hereinafter). For example, if only the air conditioner is assorted into a group of the electric appliances 3 with respect to a certain room, the room is cooled (or heated) by selecting the control option on the basis of hot and cold senses felt by a human. Immediately after returning home, a control is performed in such a way as to operate (drive) the air conditioner at a relatively low temperature setting (or at a relatively high temperature setting, in case of heating the room) and, then, to gradually increase (or decrease, in case of heating the room) the set temperature.

If the number of the air conditioners gets increased, namely if a new air conditioner is additionally installed in the same room, the existing air conditioner and the new air conditioner are assorted into the same group. The control option of driving the two air conditioners in association with each other is selected to perform a control in such a way as to, at the startup time, rapidly decrease the room temperature through the use of the two air conditioners and, then, to alternately and intermittently drive the two air conditioners.

Moreover, if a first electric blind device is already installed in one wall of a room and if a second electric blind device is additionally installed in another wall of the room, the control option of operating indoor lights in association with the first and second electric blind devices is selected to open a blind existing at a direct sunlight receiving side on a time zone basis. With this, there is no need to turn on the indoor lights.

Further, when a first light is already installed in a room, if a second light is additionally installed in the room, a control is performed in such a way as to adjust the illuminance of the first and second lights so that the room should not become too bright.

If the air conditioner 34 and the human detecting sensor 42 in the guest room are assorted into the same group, it is necessary not only to select the control option performed on the basis of hot and cold senses felt by a human but also to perform a control so that the air conditioner 34 under operation can be stopped when the existence of a human in the guest room is not detected by the human detecting sensor 42 for more than 30 minutes. In the event that a user wishes to keep the bed room temperature at a pleasant low temperature prior to going to bed, it may be possible to set the bed room temperature so that the air conditioner 35 should not be stopped even if the existence of a human in the guest room is not detected by the human detecting sensor 43 for more than 30 minutes.

In this case, it is preferred that the validity/invalidity of a restoration forget preventing function can be simultaneously set through the use of the displaying and operating device 2. The restoration forget preventing function refers to a function in which, when the basic control option of stopping the electric appliances 3 (e.g., the air conditioner) in case of no detection of the existence of a human for more than 30 minutes is changed to the control option of not stopping the electric appliances 3 even in case of no detection of the existence of a human for more than 30 minutes, the selecting unit 10B of the control block 10 automatically restores the basic control option after a specified time period (e.g., one day) is lapsed from such change.

If the air conditioner and the electric blind device as the electric appliances 3 are installed in the same room, the air conditioner and the electric blind device may be assorted into the same group. When the air conditioner is operated to cool the room in the daytime of a clear day, the electric blind device is controlled in association with the air conditioner so that the sunlight coming into the room through a window can be shaded. This makes it possible to efficiently and rapidly decrease the temperature of the room. Meanwhile, when the air conditioner is operated to heat the room in the daytime of a clear day, the electric blind device is controlled in association with the air conditioner so that the sunlight can come into the room through a window. This makes it possible to efficiently and rapidly increase the temperature of the room. If the electric appliances 3 grow larger in kind, e.g., if a window opening device is additionally installed in the room, the window opening device, the air conditioner and the electric blind device are assorted into the same group. In this instance, the electric power can be further saved by changing the control option to a control option in which the window opening device is driven in association with the air conditioner and the electric blind device.

In the control block 10, the use history information including the use time, use frequency and set content of the respective electric appliances 3 is stored in the storage unit 11. The selecting unit 108 selects (changes) the control options of the electric appliances 3 pursuant to the use history information. For example, the use history information of the air conditioner 31 and the television set 32 installed in the living room includes the operation start (ON) or stop (OFF) time of the air conditioner 31, the set temperature at the operation start time of the air conditioner 31 and the ON-time or OFF-time of the television set 32. This use history information is transmitted from the communications devices of the air conditioner 31 and the television set 32 to the home communication unit 12 of the power control device 1 and is written into the use history information list of the storage unit 11 by the information monitoring unit 10A of the control block 10, as shown in FIG. 5.

The use history information shown in FIG. 5 reveals that the air conditioner 31 installed in the living room is initially driven at about six o'clock every morning at a set temperature of 24° C. The reason for setting the wake-up time set temperature as low as 24° C. in this manner appears to be that the dweller feels the room temperature at a wake-up time too high. If the control executing unit 10C of the control block 10 starts up the operation of the air conditioner 31, e.g., at a time thirty minutes earlier than the operation start time (at about 5:30) at a set temperature of 26° C., the dweller is hard to feel hot because the room temperature is kept low when the dweller gets up.

Therefore, as compared with a case where the operation of the air conditioner 31 is started at 24° C. to rapidly cool the room, it is possible to reduce the power consumption of the air conditioner 31 and to save the electric power. After the room temperature reaches 26° C., the control executing unit 10C of the control block 10 gradually increases the set temperature of the air conditioner 31 to 28° C. This makes it possible to further save the electric power.

The use history information shown in FIG. 5 indicates that the air conditioner 31 installed in the living room is stopped at about seven thirty o'clock every morning. It is possible to save the electric power by causing the selecting unit 10B of the control block 10 to select the control option of stopping the air conditioner 31 or increasing the set temperature, e.g., at a time thirty minutes earlier than the air conditioner stop time (at about seven o'clock) and by causing the control executing unit 10C to execute the selected control option so that the amenity can be maintained only with the cold energy left in the room. A message suggesting the dweller to save the electric power in this manner can be displayed on the displaying unit 23 of the displaying and operating device 2. The control option stated just above can be executed when the dweller seeing the message inputs an operation input approving the suggestion into the operation input receiving unit 24 of the displaying and operating device 2.

As for the startup of the operation, it is equally possible to save the electric power by causing the selecting unit 10B of the control block 10 to select the control option of starting up the operation of the air conditioner 31, e.g., at a time thirty minutes earlier than the operation startup time at a set temperature of 26° C. and then gradually increasing the set temperature to 28° C. and by causing the control executing unit 10C to execute the selected control option. A message suggesting the dweller to save the electric power in this manner can be displayed on the displaying unit 23 of the displaying and operating device 2. The control option stated just above can be executed if the dweller seeing the message inputs an operation input approving the suggestion. When the dweller inputs the operation input approving the suggestion, it is possible to more flexibly cope with the situations if the operation startup time and stop time of the air conditioner 31 and the set temperature are inputted into the operation input receiving unit 24 and if the control block 10 of the power control device 1 is caused to change the operation startup time and stop time of the air conditioner 31 and the set temperature.

The information monitoring unit 10A of the control block 10 periodically confirms the operation states of all the electric appliances 3 through the home communication unit 12 and, therefore, it can detect a failure of each of the electric appliances 3. Upon detecting the failure of one of the electric appliances 3, the control block 10 releases the group to which the electric appliance 3 under failure belongs. For example, if the failure of the air conditioner 31 installed in the living room is detected, the selecting unit 10B of the control block 10 releases the group of the air conditioner 31 and the floor heater 33 and selects the control option of operating only the floor heater 33.

If the identification information (type number) of the air conditioner 31 of the appliance information list stored in the storage unit 11 of the power control device 1 is renewed upon replacing the electric appliances 3, e.g., the air conditioner 31, with a new one, the control block 10 transmits the type number of the new air conditioner to the server device S through the network communication unit 13 and acquires the performance information on the air conditioner having the type number, e.g., the information on the output power and the kinds of operation mode (such as the existence or absence of a power saving mode for restraining the maximum output power), from the server device S through network communications. The control block 10 changes the control options pursuant to the information thus acquired. For example, if the new air conditioner is larger in output power than the old air conditioner, the selecting unit 10B changes the control options so as to make relatively short the operation time of the air conditioner counted from the startup thereof.

The sense of amenity in a cooling or heating situation is related to the age and the disposition (the sensitivity to heat or cold) of a dweller. For example, the same temperature setting may be felt pleasant by a dweller insensitive to heat but may be felt unpleasant by a dweller sensitive to heat. In view of this, the dweller information relating to the afore-mentioned environment (the age and the disposition such as heat sensitivity and cold sensitivity) may be stored in the storage unit 11.

The selecting unit 10B of the control block 10 may select the control option of appropriately setting the temperature pursuant to the information on the dwellers mainly staying in the respective rooms, e.g., the control option of slightly decreasing the set temperature in keeping with the dweller sensitive to heat at the cooling time and slightly increasing the set temperature in keeping with the dweller sensitive to cold at the heating time.

In this connection, the disposition, such as heat sensitivity and cold sensitivity, of the dweller mainly staying in the room having the air conditioner can be automatically determined by the control block 10 pursuant to the use history information, e.g., the changing frequency of the set temperature of the air conditioner in case where the set temperature is frequently changed or scarcely changed. It is possible to more flexibly cope with the situations if the dwellers mainly staying in the respective rooms are selected on an hour-by-hour basis (e.g., on a three-hour basis).

In addition, the average set temperature (e.g., 25° C. at the cooling time in summer) acquired from the use history information may be stored as a threshold value in the storage unit 11. Determination may be made as to whether the disposition (such as heat sensitivity and cold sensitivity) of the dwellers is higher than or lower than the threshold value. Such determination may be reflected in selecting the control options.

Figure 2C:
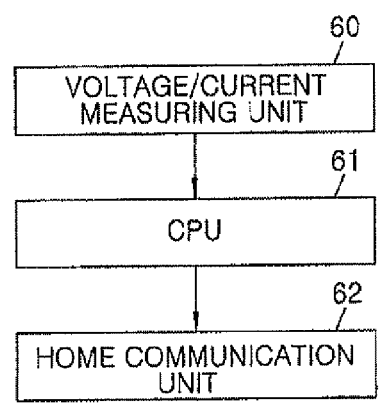
FIG. 2C is a block diagram showing an electricity meter.

The power control system of the present embodiment includes an electricity meter 6 for measuring the electricity consumed at the home. As shown in FIG. 2C, the electricity meter 6 includes a voltage/current measuring unit 60 for measuring the input voltage and the input current supplied from the power generating device 5 to the house H, a calculating unit 61 for calculating the electricity consumed at the home pursuant to the input voltage and the input current measured by the voltage/current measuring unit 60, and a home communication unit 62 for transmitting the information on the electricity (the measured value) calculated by the calculating unit 61 to the power control device 1.

The electricity meter 6 frequently transmits the measured power consumption to the power control device 1 through the home communication unit 62. The control block 10 allows the storage unit 11 to store the measured values of power consumption received from the electricity meter 6 together with the time of measurement. It is therefore possible to transmit the measured values of power consumption from the power control device 1 to the displaying and operating device 2, thereby allowing the displaying unit 23 of the displaying and operating device 2 to display the power consumption at an arbitrary time (e.g., on the one-year-ago same day or the previous day).

If an operation input used in setting an upper limit value of power consumption is received by the operation input receiving unit 24 of the displaying and operating device 2, the data indicating the upper limit value is transmitted from the displaying and operating device 2 to the power control device 1. If it is determined pursuant to the measured values of the electricity meter 6 and the operation states of the electric appliances 3 that the power consumption may possibly exceed the upper limit value, the selecting unit 10B of the control block 10 changes the control options so that the power consumption should not exceed the upper limit value and causes the displaying unit 23 of the displaying and operating device 2 to display a warning notice.

For example, if a dweller changes the set temperature of the air conditioner 31 to a lower value in a state that the air conditioners 31, 34 and 35 are under a cooling operation, the selecting unit 10B of the control block 10 selects the control option of restraining an increase in power consumption by changing the set temperatures of the air conditioners 34 and 35 to higher values. At this time, it may be possible to select the control option of making the set temperatures of the air conditioners 34 and 35 in the rooms where the existence of a human is not detected by the human sensors 42 and 43 greater than the set temperature of the air conditioner 31 in the room where the existence of a human is detected. Or, the control option of intensively operating the air conditioners 31, 34 and 35 one after another may be possible.

In case of performing a control so that the power consumption should not exceed the upper limit value, it is preferred that the electric appliances to be operated at all times, such as the refrigerator 36, or the electric appliances requiring no change in set temperature, such as the air conditioner in the room where a senior or an infant stays, be assorted into the same group in advance and be excluded from the objects whose power consumption is to be restrained. It may be possible for the control block 10 to elect the electric appliances having a reduced use frequency (e.g., the illumination devices installed in a corridor or a stairway) pursuant to the use history information and to first stop the electric appliances having a reduced use frequency when the power consumption is likely to exceed the upper limit value.

In general, the power consumption of electric products (especially, an air conditioner) becomes smaller as the electric products are newer. In light of this, the information on the newest air conditioner (e.g., the power consumption) is stored in the server device S. The one-day or one-month use history information of the air conditioners 31, 34 and 35 stored in the storage unit 11 of the power control device 1 is acquired from the power control device 1 through the Internet NW. The power consumption when operating the newest air conditioner according to the use history information is simulated in the server device S pursuant to the acquired use history information and the information on the newest air conditioner.

The result of the simulation performed by the server device S (i.e., the power consumption) is displayed on the displaying unit 23 of the displaying and operating device 2 by way of the power control device 1. This makes it possible to urge a dweller to purchase a new air conditioner having an increased power saving effect. The simulation result may include not only the power consumption but also the information on the cost such as the electric power charge. A URL of a shopping site where the new air conditioner can be purchased may be transmitted from the server device S to the displaying and operating device 2 via the power control device 1. The web browser installed in the CPU 20 of the displaying and operating device 2 may display the web page of the URL on the display unit 23.

In this regard, the server device S is capable of acquiring the measured values of power consumption from a plurality of houses. The server device S collects the power consumption data of the air conditioners having the same type number and finds the statistical values (such as an average value, a variance, a standard deviation and the like). If the measured value of power consumption of the air conditioner acquired from one house H deviates from a normal range set pursuant to the statistical values, a notice warning the failure of the air conditioner or the erroneous use of the air conditioner is transmitted to the power control device 1 of the house H and is displayed on the displaying unit 23 of the displaying and operating device 2. This makes it possible to urge a dweller to correct the warned issue (the failure or the erroneous use of the air conditioner), thereby saving the electric power.

The electric appliances have standard durable years (life spans) corresponding to the kinds thereof. The failure rate of the electric appliances is sharply increased if the use time periods exceed the durable years. If the air conditioner, the television set or the refrigerator gets out of order, the daily life of a dweller may possibly be hindered. It is therefore desirable to notify a dweller of the arrival at the end of a life span prior to exceeding the durable years. In the present embodiment, the control block 10 determines, pursuant to the use history information such as the use time period and the use frequency of the respective electric appliances 3, whether each of the electric appliances 3 has reached the end of the life span. If it is determined that one of the electric appliances 3 has reached the end of the life span, such fact is displayed on the displaying unit 23 of the displaying and operating device 2 to be notified to a dweller.

In case of the electric appliances 3 operating at all times, such as the refrigerator, the end of the life span thereof may be determined on the basis of the operating years. In case of the electric appliances 3 not operating at all times, such as the air conditioner and the television set, the end of the life span thereof may be determined on the basis of the accumulated operating time. Moreover, the control block 10 notifies the server device S of the kinds and type numbers of the electric appliances 3 (the air conditioner, the television set, the refrigerator and the like) and acquires the information on the durable years of the electric appliances stored in the server device S.

Depending on the durable years thus acquired, the control block 10 sets the threshold values for the determination of the end of the life span. The threshold values are set by referring to the dweller's demand inputted into the operation input receiving unit 24 of the displaying and operating device 2, namely the demand for frequent replacement of the electric appliances with new ones or the demand for long term use of the electric appliances. In case of the former demand, the threshold value may be set shorter. In case of the latter demand, the threshold value may be set longer.

In this connection, the server device S collects the failure occurrence situations (the use years and the accumulated operating time at the time of failure) of the electric appliances 3 installed in a plurality of houses and calculates the statistical values corresponding to the regions where the houses exist. For example, when it is determined that the failure rate is relatively high in the region near the sea (typically, there is a tendency that the failure of the electric appliances frequently occurs in the region near the sea due to the salt components contained in the air), it is preferred that the server device S request the power control device 1 to reduce the threshold value in the region near the sea.

The control options to be stored in the storage unit 11 of the power control device 1 can be additionally downloaded from the server device S through the Internet NW. In other words, when the type number and the use history information of the newly added or replaced electric appliance 3 are transmitted from the power control device 1 to the server device S, the server device S elects new control options corresponding to the diagnosis result of the type number and the use history information of the electric appliance 3. The new control options can be downloaded from the server device S to the power control device 1 through the Internet NW.

When the various kinds of information are transmitted from the power control device 1 to the server device S in the manner set forth above, it is necessary to secure safety for network communications between the power control device 1 and the server device S. For example, when the power control device 1 inquires the server device S about the information on the replaced electric appliance, it is necessary for the control block 10 to acquire the authentication information held in the electric appliance in advance. The access to the power control device 1 may be permitted only if the server device S successfully authenticates the power control device 1 (the electric appliance) by using the authentication information. In case where the power control device 1 requests the server device S to perform a simulation, the information (data) may be encoded by using the manufacture's serial number of the power control device 1 or the displaying and operating device 2 as a key.

Second Embodiment

FIG. 6 is a system configuration diagram showing a power control system according to a second embodiment. The basic configuration of the power control system of the present embodiment is common to that of the first embodiment. The common components will be designated by like reference symbols with no description made thereon.

The power control system of the present embodiment differs from the power control system of the first embodiment in that it includes a smart meter 7 for measuring a system power supplied from a power system AC of a power company to the house H and for making data communications with the power company.

The smart meter is a generic name of a high-performance electricity meter with a function of making communication or managing other devices, or a system (a smart grid) including the high-performance electricity meter. The smart meter is sometimes called an "AMI (Advanced Metering Infrastructure)". The smart meter is usually provided with a function of making wireless communications within a short distance of about several ten to several hundred meters and is connected to electric appliances such as an air conditioner, a hot water supplying device, an illumination device, a television set, a refrigerator or the like. The operating situations of the electric appliances are sent to the power company via a network.

If necessary, the power company may control the electric appliances. For example, when the electric power of the power system AC is insufficient, the power company transmits a control command to the smart meter. Responsive to the control command, the smart meter increases the temperature of the air conditioner or stops to supply electric power to the electric appliance having a low priority, thereby controlling the power consumption in the user's electric appliances.

The smart meter 7 of the present embodiment does not directly control the electric appliances 3 pursuant to the control command received from the power company but relays the control command to the power control device 1.

Pursuant to the control command received from the power company through the smart meter 7, the control block 10 of the power control device 1 performs power control of the control options (1) through (3) set forth below.

(1) In case where reduction of the power consumption only is needed

If the control command received from the power company is to increase the set temperatures for the cooling operation of the air conditioners 31, 34 and 35 by 1° C., the control block 10 of the power control device 1 searches for an electric appliance 3 whose power consumption can be reduced by the amount equivalent to the power consumption reduced by the 1° C. increase of the set temperatures of the air conditioners 31, 34 and 35. If such electric appliance 3 exists, the power consumption of the house H as a whole is reduced by controlling the electric appliance 3 instead of increasing the set temperatures of the air conditioners 31, 34 and 35 by 1° C. This keeps the amenity felt by the user.

(2) In case where forcible execution of the control command is need

When the control command received from the power company is to forcibly reduce the power consumption, the control block 10 of the power control device 1 reduces the power consumption of the house H as a whole by controlling the electric appliances 3 except the electric appliances 3 assorted into the stop-inhibited group (e.g., the refrigerator 36). However, if the control command received from the power company is to increase the set temperatures for the cooling operation of the air conditioners by 1° C., the control block 10 of the power control device 1 controls the air conditioners 31, 34 and 35 pursuant to the control command so that the set temperatures can be increased by 1° C.

(3) In case where decision is made through negotiation with the power company

When the control command received from the power company is to reduce the power consumption in the entire region including the house H, the options capable of reducing the power consumption (in, e.g., cooling, illuminating, TV watching or the like) and a result from the simulation of power consumption reduction amount are transmitted from the control block 10 of the power control device 1 to the power company via the smart meter 7. Pursuant to the power consumption reduction amount received from the power control device 1, the server of the power company determines whether the power consumption reduction goal may be accomplished in the entire region or not. The result of determination is sent back to the power control device 1 through the smart meter 7.

If the result of determination received from the server of the power company indicates that the power consumption reduction goal may be accomplished, the control block 10 of the power control device 1 controls the electric appliances 3 as simulated. Or, if the result of determination indicates that the power consumption reduction goal cannot be accomplished, the control block 10 of the power control device 1 performs a second simulation and transmits the simulation result to the server of the power company via the smart meter 7.

In order to reduce the frequency of communications made through the smart meter 7, a plurality of simulations may be conducted from the beginning and a plurality of the simulation results may be simultaneously transmitted from the power control device 1 to the server of the power company.

In case of a configuration in which the smart meter 7 directly controls the electric appliances 3, there is posed a problem in that each of the electric appliances 3 should be provided with a communications device for making communications with the smart meter 7 in addition to the communications device for making communications with the power control device 1. Moreover, communication lines should be further provided to enable the smart meter 7 to make wired communication with the electric appliances 3.

In the present embodiment, however, the smart meter 7 does not directly control the electric appliances 3. Instead, the power control device 1 controls the electric appliances 3 pursuant to the instruction (control command) transmitted from the power company to the smart meter 7. This removes the need to add new communications devices to the electric appliances 3 or to install new communication lines at the home. Accordingly, it is possible to easily cope with a smart grid.

While certain preferred embodiments of the present invention have been described above, the present invention is not limited to these embodiments but may be modified or changed in many different forms without departing from the scope of the invention defined in the claims. Such modifications or changes shall be construed to fall within the scope of the invention.

What is claimed is:

1. A power control system, comprising:
   a plurality of electric appliances; and
   a power control device configured to control operations of the electric appliances,
   wherein the electric appliances are assorted into one or more groups each including two or more electric appliances, and the power control device is configured to control operations of the electric appliances on a group-by-group basis according to a plurality of control options prepared in advance based on state information of the electric appliances, and
   wherein the power control device is configured to store, as a threshold value, an average setting value acquired from use history information including use time, use frequency and setting content of the electric appliances and determine disposition of a dweller based on the threshold value to reflect the disposition of the dweller in selecting the control options.

2. The power control system of claim 1, wherein the power control device is configured to change the control options depending on the kind and number of the electric appliances belonging to the same group as the state information.

3. The power control system of claim 1, wherein the one or more groups include a group including a plurality of cooling and heating electric appliances, and wherein the power control device is configured to control the cooling and heating electric appliances in association with each other.

4. The power control system of claim 1, wherein the one or more groups include a human detector for detecting a human existing in a monitoring region and notifying the power control device of presence or absence of the human, and wherein the power control device is configured to control the electric appliances by use of different control options when the human is detected by the human detector and when the human is not detected by the human detector.

5. The power control system of claim 1, wherein the one or more groups include a group to which electric appliances required to be operated at all times belong.

6. The power control system of claim 5, wherein the power control device is configured to receive a control command from a power company and to reduce power consumption by controlling electric appliances other than the electric appliances required to be operated at all times, when the control command requests the power control device to reduce power consumption.

7. The power control system of claim 5, wherein the power control device is configured to receive an operation input setting an upper limit value of power consumption and to reduce power consumption by controlling electric appliances other than the electric appliances required to be operated at all times, when it is determined that the power consumption is likely to exceed the upper limit value.

8. The power control system of claim 1, wherein the power control device is configured to detect failure of the electric appliances by confirming operation states of the electric appliances and when failure of one of the electric appliances is detected, the power control device releases a group to which said one of the electric appliances belongs.

9. The power control system of claim 1, further comprising:
   a server device for making data communications with the power control device, wherein, when one of the electric appliances is replaced and identification information thereof is renewed, the power control device transmits the renewed identification information to the server device and acquires performance information of the electric appliance corresponding to the renewed identification information from the server device to change the control options pursuant to the performance information.

10. The power control system of claim 1, further comprising:
 a server device for making data communications with the power control device, wherein the power control device transmits identification information of the electric appliances and measured power consumption of the electric appliances to the server device, and wherein the server device finds a statistical value of power consumption on the electric appliance having the same identification information as the identification information received and transmits a warning notice to the power control device if the power consumption received is out of a normal range set pursuant to the statistical value.

* * * * *